United States Patent [19]
Mowers

[11] Patent Number: 5,850,196
[45] Date of Patent: Dec. 15, 1998

[54] TRACKING DEVICE FOR PETS

[76] Inventor: Marty G. T. Mowers, 180 Eastwood Rd., Toronto, Ontario, Canada, M4L 2E3

[21] Appl. No.: 933,171

[22] Filed: Sep. 18, 1997

[51] Int. Cl.⁶ .............................. H04B 7/185; G01S 5/02
[52] U.S. Cl. ........................................................... 342/357
[58] Field of Search ............................ 342/357; 128/899; 424/423; 427/2.14; D24/155; 119/720, 721, 908

[56] References Cited

U.S. PATENT DOCUMENTS

| | | |
|---|---|---|
| 4,706,689 | 11/1987 | Man . |
| 5,558,618 | 9/1996 | Maniglia ................................... 600/25 |
| 5,589,834 | 12/1996 | Weinberg ................................. 342/354 |
| 5,629,678 | 5/1997 | Gargano et al. ......................... 340/573 |

*Primary Examiner*—Theodore M. Blum

[57] ABSTRACT

A new tracking device for pets for locating objects. The inventive device includes a microchip transmitter encapsulated within a biologically inert material and coupled with respect to a pet and communicating with a satellite system.

3 Claims, 2 Drawing Sheets

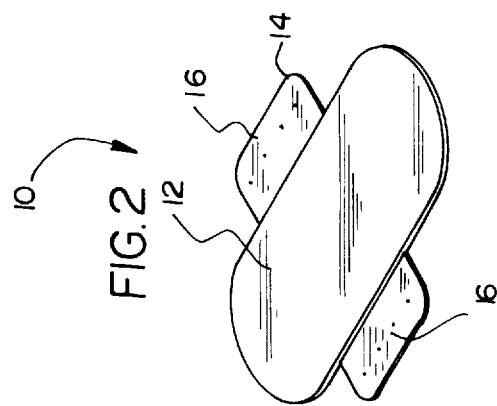
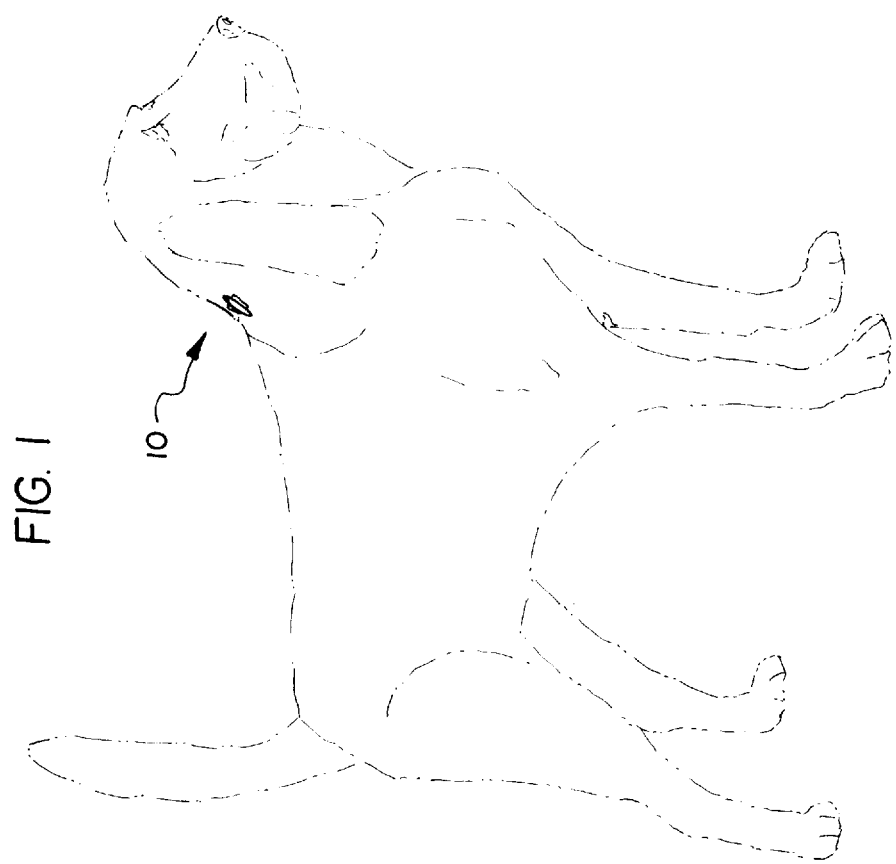

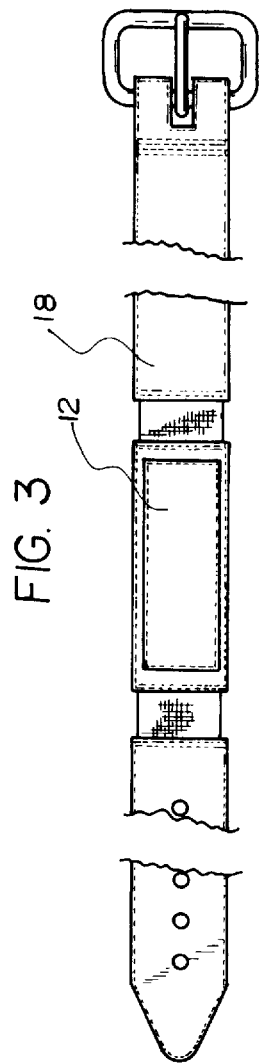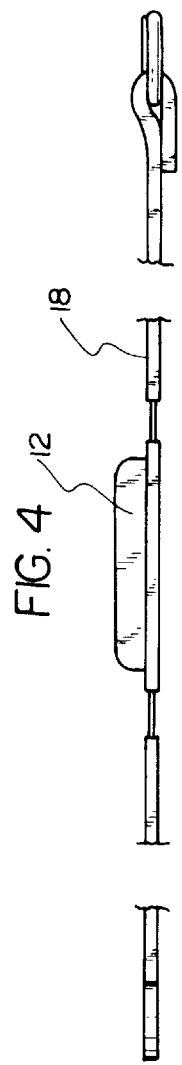

000
TRACKING DEVICE FOR PETS

BACKGROUND OF THE INVENTION

1. Field of the Invention

The present invention relates to homing devices and more particularly pertains to a new tracking device for pets for locating objects.

2. Description of the Prior Art

The use of homing devices is known in the prior art. More specifically, homing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art homing devices include U.S. Pat. No. 4,706,689 to Man; U.S. Pat. No. 4,854,328 to Pollack; U.S. Pat. No. 5,418,537 to Bird; U.S. Pat. No. 5,443,066 to Dumoulin et al.; U.S. Pat. No. 5,007,285 to Dahlen et al.; and U.S. Pat. No. 5,214,410 to Verster.

While these devices fulfill their respective, particular objectives and requirements, the aforementioned patents do not disclose a new tracking device for pets. The inventive device includes a microchip transmitter encapsulated within a biologically inert material and coupled with respect to a pet and communicating with a satellite system.

In these respects, the tracking device for pets according to the present invention substantially departs from the conventional concepts and designs of the prior art, and in so doing provides an apparatus primarily developed for the purpose of locating objects.

SUMMARY OF THE INVENTION

In view of the foregoing disadvantages inherent in the known types of homing devices now present in the prior art, the present invention provides a new tracking device for pets construction wherein the same can be utilized for locating objects.

The general purpose of the present invention, which will be described subsequently in greater detail, is to provide a new tracking device for pets apparatus and method which has many of the advantages of the homing devices mentioned heretofore and many novel features that result in a new tracking device for pets which is not anticipated, rendered obvious, suggested, or even implied by any of the prior art homing devices, either alone or in any combination thereof.

To attain this, the present invention generally comprises a microchip transmitter encapsulated within a biologically inert material. The transmitter has a pair of tabs extending outwardly from opposing edges thereof. The tabs each have a series of perforations for receiving threads therethrough. The transmitter is implanted into a soft tissue of pet and communicates with a satellite system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tracking device for pets apparatus and method which has many of the advantages of the homing devices mentioned heretofore and many novel features that result in a new tracking device for pets which is not anticipated, rendered obvious, suggested, or even implied by any of the prior art homing devices, either alone or in any combination thereof.

It is another object of the present invention to provide a new tracking device for pets which may be easily and efficiently manufactured and marketed.

It is a further object of the present invention to provide a new tracking device for pets which is of a durable and reliable construction.

An even further object of the present invention is to provide a new tracking device for pets which is susceptible of a low cost of manufacture with regard to both materials and labor, and which accordingly is then susceptible of low prices of sale to the consuming public, thereby making such tracking device for pets economically available to the buying public.

Still yet another object of the present invention is to provide a new tracking device for pets which provides in the apparatuses and methods of the prior art some of the advantages thereof, while simultaneously overcoming some of the disadvantages normally associated therewith.

Still another object of the present invention is to provide a new tracking device for pets for locating objects.

Yet another object of the present invention is to provide a new tracking device for pets which includes a microchip transmitter encapsulated within a biologically inert material and coupled with respect to a pet and communicating with a satellite system.

Still yet another object of the present invention is to provide a new tracking device for pets that locates missing pets using satellites and radio direction finding techniques.

Even still another object of the present invention is to provide a new tracking device for pets that provides a microchip transmitter that could be encapsulated in a biologically inert material.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new tracking device for pets according to the present invention.

FIG. 2 is an isolated perspective view of the present invention.

FIG. 3 is a plan view of a second embodiment of the present invention.

FIG. 4 is a side view of the second embodiment of the present invention.

DESCRIPTION OF THE PREFERRED EMBODIMENT

With reference now to the drawings, and in particular to FIGS. 1 through 4 thereof, a new tracking device for pets embodying the principles and concepts of the present invention and generally designated by the reference numeral 10 will be described.

As best illustrated in FIGS. 1 through 6, the tracking device for pets 10 comprises a microchip transmitter 12 encapsulated within a biologically inert material. The transmitter 12 has a pair of tabs 14 extending outwardly from opposing edges thereof. The tabs 14 each have a series of perforations 16 for receiving threads therethrough. The transmitter 12 is implanted into a soft tissue of pet and communicates with a satellite system. The perforations 16 allow for the transmitter to be properly sewed within the soft tissue of the pet without risk of the transmitter becoming moved or disengaged.

A second embodiment of the present invention is illustrated in FIGS. 3 and 4 and includes essentially all of the components of the preferred embodiment, but instead of implanting the microchip transmitter 12 within the soft tissue of the pet, it is secured to a collar 18 that is engaged around the neck of the pet.

In use, the present invention is an emergency location device that could be used to locate missing pets using satellites and radio direction finding techniques. One part of this-proposed system would be a low power microchip homing transmitter 12 that could operate in an assigned frequency range for commercial satellite communications. This microchip transmitter 12 could be encapsulated in a biologically inert material and surgically implanted into soft tissue of the pet, thereby providing a means of tracking the animal any time it was lost or stolen. Part of the satellite receiving and direction finding system could be low-earth orbiting or geostationary satellites with highly sensitive receiver circuitry. These orbiting receiving and relay systems are suggested to be used to triangulate the approximate location of a pet implanted with the transmitter 12. Such a proposed satellite-based system could be somewhat like the NAVSTAR or Global Positioning Satellite (GPS) systems with respect to the ability to provide precise latitude and longitude information for determining the approximate location of the pet. Each implanted microchip transmitter 12 would also utilize an encoding scheme to specifically identify the pet. After having obtained approximate location information via the satellite network, small and portable radio direction finding equipment could be used by animal control personnel to pinpoint the pet's location.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tracking device for implantation within a pet for tracking and locating the pet if the pet is lost comprising, in combination:

a microchip transmitter encapsulated within a biologically inert material, the transmitter having a pair of tabs extending outwardly from opposing edges thereof, the tabs each having a series of perforations for receiving threads therethrough, the transmitter being implanted into a soft tissue of the pet, said microchip being for communicating with a satellite system such that the pet can be located by communicating with the satellite system.

2. A tracking device for a pet for tracking and locating the pet when the pet is lost comprising, in combination:

a microchip transmitter encapsulated within a biologically inert material, the transmitter being implanted within the pet, the transmitter further being for communication with a satellite system such that the pet can be located by communication with the satellite system, the biologically inert material being formed into a substantially planar housing and the housing being substantially rectangular shaped with rounded corners; and a pair of substantially planar tabs oppositionally disposed from said housing, said pair of tabs being formed from biologically inert material, each of said pair of tabs having rounded corners, each of said pair of tabs including a plurality of perforations, each of said perforations being for receiving a thread such that each of said pair of tabs is couplable to soft tissue of the pet by suturing each of said pair of tabs to the soft tissue of the pet.

3. The tracking device for a pet as in claim 2, wherein the perforations are positioned along an outermost edge of each respective tab.

* * * * *